Figure 1:
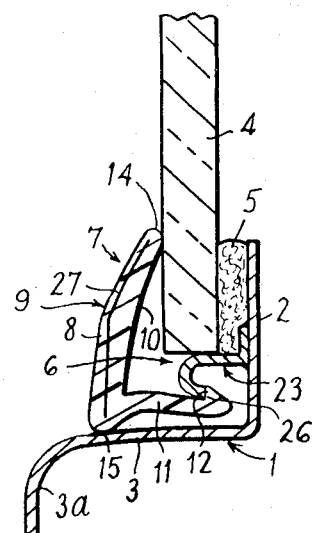

United States Patent [19]

Kent

[11] 3,774,363

[45] Nov. 27, 1973

[54] GLAZING WINDOW OR WINDSCREEN OPENINGS, PARTICULARLY IN VEHICLE BODIES

[75] Inventor: Cecil Kent, Woking, Surrey, England

[73] Assignee: Creators Limited, Woking, England

[22] Filed: May 10, 1971

[21] Appl. No.: 141,634

[52] U.S. Cl. ............... 52/400, 52/208, 52/401, 52/402, 52/718
[51] Int. Cl. ............................................. E06b 3/58
[58] Field of Search .................. 52/400, 502, 500, 52/498, 716–718, 208, 403, 401, 402, 393, 476; 49/492; 296/93, 84 R

[56] References Cited
UNITED STATES PATENTS

| | | | |
|---|---|---|---|
| 3,155,204 | 11/1964 | Campbell et al. | 52/208 |
| 3,274,740 | 9/1966 | Hall | 52/718 |
| 3,245,182 | 4/1966 | Zierold | 52/393 |
| 3,363,385 | 1/1968 | Evans et al. | 52/476 |
| 3,241,277 | 3/1966 | Coppock | 296/93 |
| 3,478,476 | 11/1969 | Kemp | 296/93 |
| 3,155,422 | 11/1964 | Campbell et al. | 296/93 |
| 3,413,770 | 12/1968 | Adams | 52/476 |
| 3,514,916 | 6/1970 | Hoverman | 52/400 |
| 2,647,289 | 8/1953 | Harbert | 52/403 |
| 3,338,007 | 8/1967 | Draplin | 52/476 |

FOREIGN PATENTS OR APPLICATIONS

| | | | |
|---|---|---|---|
| 2,000,978 | 9/1969 | France | 52/502 |
| 979,707 | 1/1965 | Great Britain | 52/400 |

Primary Examiner—Frank L. Abbott
Assistant Examiner—Leslie A. Braun
Attorney—Larson, Taylor, & Hinds

[57] ABSTRACT

The invention relates to glazing window or windscreen openings, particularly in vehicle bodies by securing the glass by means of adhesive between the back of the glass and the back of the rebate. The edge of the glass is surrounded by at least one length of a decorative trim strip of flexible plastics material or a rubber-like elastomer having a front strip portion which covers the space between the edge of the glass and the wall of the rebate and also the front edge of the glass. The trim strip is constructed so that it can be positioned around the glass after the glass has been inserted in the rebate and secured by the adhesive, thus enabling the area of contact of the adhesive to be easily inspected before it is hidden by the fitting of the trim strip.

5 Claims, 8 Drawing Figures

GLAZING WINDOW OR WINDSCREEN OPENINGS, PARTICULARLY IN VEHICLE BODIES

The present invention relates to glazing window or windscreen openings, particularly in vehicle bodies, in which the glass (which term is used herein to include other transparent materials) is secured in the rebate of the opening with the aid of an adhesive, and a trim strip made of rubber or a flexible plastics material surrounds the edge of the glass.

The specifications of copending applications U.S. Pat. Nos. 827633 (filed May 26, 1969) and 865428 (filed Oct. 10, 1969) now abandoned describe trim strips of flexible plastics material or a rubber-like elastomer for use in glazing windows or windscreens in vehicle bodies, comprising a channel portion dimensioned to embrace the edge of the glass and a front strip portion which extends from the edge of the front wall of the channel, that is the wall which is to lie against the outer surface of the glass, so as to overlie said front wall and project beyond the base of the channel, said front strip portion being free to flex away from said front wall of the channel about its junction with said edge of said front wall.

In order to glaze a window or windscreen opening using such trim strips, it is necessary to assemble the trim strip around a glass panel with the edge of the glass panel embraced by the channel portion of the trim strip before the glass panel, with the trim strip therearound, is inserted into the rebate and secured by the adhesive. Consequently the adhesive securing the glass in the rebate is at least partially obscured by the trim strip and it is not an easy matter to inspect and make certain that the adhesive is properly applied all around the window opening, with the minimum area of contact prescribed by the manufacturers' specification or by official regulations.

The present invention is concerned with a glazing system and the construction of a trim strip for use therewith which enables the trim strip to be positioned around the glass panel after the glass panel has been inserted in the rebate and secured by the adhesive. The invention thus enables the area of contact of the adhesive to be easily inspected before it is hidden by the fitting of the trim strip.

The invention consists in a window or windscreen assembly in which the glass is secured with the aid of an adhesive to the back wall of a rebate defining an opening in which the glass is fitted and the edge of the glass is surrounded by a trim strip of a flexible plastics material or a rubber-like elastomer which comprises a front strip portion which covers the space between the edge of the glass and the wall of the rebate and also the front edge of the glass, and a web portion extending rearwardly of the front strip portion and into said space and having a shoulder adjacent its free end engaged by retainer means within the rebate.

The inner and outer edges of the front strip portion may engage the front of the glass and the front of the rebate respectively. Or the outer edge may engage the peripheral wall of the rebate. Conveniently the web portion is joined to the front strip portion nearer to the outer edge than the inner edge thereof and may be joined thereto adjacent the outer edge. Preferably the front strip portion is rearwardly curved or bent in cross-section.

In another form, the web portion is connected to the front strip portion by a connecting strip portion which lies against the front of the glass, the front strip portion being flexibly joined along its inner edge only to the inner edge of the connecting strip portion and overlying said connecting strip portion and projecting beyond the other edge of the connecting strip portion, and the web portion being joined to the connecting strip portion at or adjacent its said other edge.

The retainer means may be provided on the rebate and comprise a retainer strip or members fixed to the rebate and having a rearwardly facing shoulder which is directed outwardly towards and spaced from the peripheral wall of the rebate so as to intergage with the shoulder on the web portion.

In this specification and the claims the word "outwardly" refers to the directions extending outwardly of the edge of the glass panel in the plane of the panel, and "outer edge" of a part means that edge of the part which lies "outwardly" of its other edge. "Inwardly" and "inner edge" have the opposite meanings.

The front strip portion of the trim strip is preferably provided with a decorative metallic appearance. For example, the trim strip may be extruded of a transparent or translucent plastics material and have a metal foil, for example aluminium foil, or a metallised plastics foil embedded therein, the foil preferably being rearwardly curved or bent in cross-section, and being visible through the front surface of the front strip portion. Or a metal foil or metallised plastics foil may be bonded to the front surface of said front strip portion.

In order to ensure that the flexible decorative trim strip will be fitted in a manner which provides an attractive and uniform appearance, without waviness along its length, as well as providing the desired covering of the gap between the edge of the glass and the peripheral wall of the rebate, it is important that the trim strip be held in place by the retainer means at the top, bottom and sides of the window opening and in such positions that the outer edge of the front strip portion will be uniformly located all around the window opening with respect to the peripheral wall of the rebate. To this end, the retainer means must be disposed in each of those parts of the rebate which are at the top, bottom and sides of the opening so as to be substantially continuous or so closely spaced that the trim strip is sufficiently strong to resist bulging forwardly of the glass panel at positions intermediate the retainer means, and furthermore the retainer means should be located around the glass panel with a pre-determined spacing or spacings from the peripheral wall of the rebate so that the outer edge of the front strip portion of the trim strip will be uniformly located against, and without undesired waviness relative to, the peripheral wall of the rebate. By providing such predetermined positioning of the retainer means, the location of the trim strip relative to the rebate is independent of variations in the size of the glass panel, the width of the front strip portion being sufficient to extend over the peripheral zone at the front of the glass panel.

In a preferred form of the invention, the retainer means have shoulder-like retention means and are secured to the rebate with the said retention means facing outwardly of the edge of the glass panel and towards the back wall of the rebate, and the web portion of the trim strip has shoulder-like retention means adjacent its free edge which engage with the shoulder-like retention means of the retainer means when the trim strip is fitted in position, and the trim strip is so dimensioned that when so fitted the inner edge zone of the front strip portion presses against the front of the glass and assists in retaining the glass panel in the rebate, supplementing the holding power of the adhesive against separation of the glass panel from the back wall of the rebate. In the event of any force tending to separate the glass panel from the back wall of the rebate, for example the force exerted on a windscreen in the event of an accident, movement of the glass panel is additionally resisted by the trim strip which is separately secured to the rebate. The trim strip is designed and constructed such that the normal pressure on the inner edge of the front strip portion of the trim strip, as well as any additional force exerted thereon due to any forward movement of the glass panel, acts to fulcrum the trim strip in such a way that the shoulder-like retention means on the web portion is urged in a direction to maintain engagement with the shoulder-like retention means of the retainer means.

Depending on the shape of the windscreen or window opening to be glazed, the decorative trim strip may be fitted in one or more lengths. Thus if the windscreen has some sharply angled corners, separate lengths of trim strip must be fitted along the glass panel edges adjacent the corner and joined together if necessary by corner pieces or clips. At corners which have a sufficiently large radius, a length of trim strip may be bent around such corners.

It will be appreciated that the invention enables pre-inspection of the adhesion between the glass and the rebate to be easily carried out, visually and/or by test equipment, the trim strip only being fixed subsequently and providing a neat and decorative finish to the window assembly.

Figure 2:
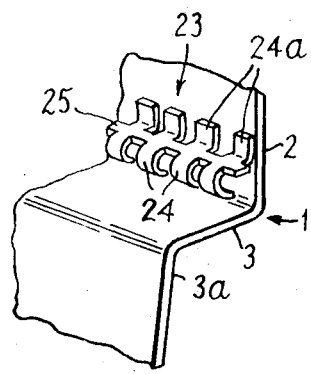

In order that the invention may be more readily understood, reference will now be made to the accompanying drawings, in which:

FIG. 1 is a scrap section of one embodiment of windscreen assembly according to the invention, FIG. 2 is a scrap view of the rebate of the embodiment shown in FIG. 1 showing the retainer means, and FIGS. 3 to 8 are scrap sections of further embodiments of windscreen assembly according to the invention.

Referring to FIG. 1 of the drawings, 1 represents part of a vehicle body adjacent the windscreen opening formed by a rebate having a back wall 2, a peripheral wall 3 and a front shoulder 3a. The glass 4 is stuck to the back wall 2 of the rebate by means of an adhesive sealant 5, for example a butyl rubber adhesive sealant, or it may be of the thermosetting type. A gap 6 surrounding the edge of the glass is covered by at least one length of a trim strip 7 extruded of a flexible plastics material, such as polyvinyl chloride. As shown, the trim strip is generally L-shaped in cross-section and comprises a rearwardly bent front strip portion 8, having a generally convex front fact 9, and a web portion 11 joined to the back 10 of the front strip portion adjacent the outer edge 15 of the latter. The front face 9 of the front strip portion may be a convex curve or, as shown, it may be formed by two widely diverging plane surfaces, in which case the rear surface may have a similar shape so that the front strip portion has a bent, shallow V-shaped, cross-section. A projection of saw-tooth shape, tapering towards the free edge of the web, extends along the free edge of the web 11, forming a retention shoulder 12 directed inwardly of the window opening and facing forwardly, i.e. towards the front strip portion.

The trim strip is positioned around the edge of the glass within the rebate 1 with the inner and outer edges 14, 15 of the front strip portion 8 engaging against the front of the glass 4 and the peripheral wall 3 of the rebate respectively. It is retained in position by retainer means provided in the rebate 1. The retainer means suitably comprises a retainer strip fixed to the rebate by any suitable mechanical connection, e.g. by welding or rivetting, and defining an outwardly directed, rearwardly facing shoulder 26 behind which the inwardly directed, forwardly facing shoulder 12 on the web 11 latches.

As shown, the trim strip is retained in position by a metal retainer strip 23 (see also FIG. 2) secured to the back wall 2 of the rebate. The strip 23 comprises narrow hook-shaped elements 24, facing outwardly towards the peripheral wall 3, interconnected by short webs 25 and having feet 24a welded to the back wall 2 of the rebate so that the free ends of the hooks form an outwardly and rearwardly facing shoulder 26 disposed in the space 6 and spaced in front of the back wall 2 of the rebate and inwardly of the peripheral wall 3. The shoulder 12 on the web 11 of the trim strip engages behind the shoulder 26, the strip 23 being spaced sufficiently from the wall 3 to allow the enlarged end of the web to be pressed into the space behind the shoulder 26. The subdivided construction of the strip 24 enables it to be easily bent around the corners of the rebate so as to be uniformly spaced from the peripheral wall 3 around the rebate. The glass may, as shown, be supported in the windscreen opening by its lower edge resting on the retainer strip in the bottom part of the rebate.

The trim strip is dimensioned so that when the shoulder 12 engages the shoulder 26 and the outer edge 15 of the front strip portion enages the wall 3, the inner edge 14 is pressed against the front of the glass so that the trim strip is firmly held in position. The front strip portion is wide enough to accommodate variations in the size of gap between the glass panel and the windscreen opening, the outer edge 15 at all times fitting snugly against the rebate and forming a fulcrum about which the reaction on the inner edge of the front strip portion urges the trim strip to rock in a direction urging the shoulder 12 to maintain engagement with the shoulder 26.

In order to glaze the windscreen opening shown in FIG. 1, a layer of the adhesive sealant 5 is applied to the back wall 2 of the rebate and the glass panel 4 inserted into the rebate with its lower edge resting on the retainer strip 23 in the bottom portion of the rebate. Pressure is then exerted on the front of the glass panel to compress the adhesive between it and the back wall of the rebate and stick the glass panel to the back wall of the rebate. After inspecting to ensure the adhesion is as prescribed the strip 7 is inserted, the web portion 11 being inserted into the space 6 around the edge of the glass and its free end pressed into the space behind the shoulder 26 so that the shoulder 12 on the web 11 engages behind the shoulder 26 on the retainer strip, as shown, to firmly hold the web portion and secure the trim strip in position with the edges 14, 15 of the front strip portion urged against the front of the glass and the peripheral wall 3 of the rebate respectively.

Figure 3:
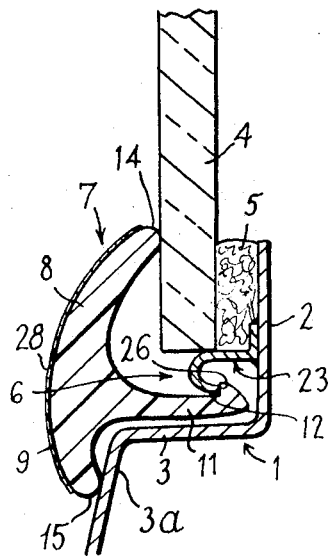

Instead of the outer edge 15 of the front strip portion 8 of the trim strip engaging the peripheral wall of the rebate as shown in FIG. 1, the trim strip may be generally T-shaped in cross-section and fitted with the edge 15 engaging the front 3a of the rebate. Such an arrangement is shown in FIG. 3 in which the trim strip is retained in position by a retainer strip 23 as shown in FIG. 2, and the trim strip is dimensioned so that the edges 14, 15 of the front strip portion 8 press firmly against the front of the glass 4 and the front shoulder 3a of the rebate respectively when the shoulder 12 is in engagement with the shoulder 26. The trim strip 7 is shown here with an arcuate front strip portion having a convex curved front face 9 to which is secured a metal foil or metallised plastics foil 28. The part of the front strip portion overlying the glass 4, that is the inner part, is wide enough to accommodate variations in the sizes of the glass panel 4, the web portion being located with respect to the peripheral wall of the rebate and the shoulders 12 and 26 being maintained in engagement by the force on the edge 14 urging the strip to fulcrum about the edge 15.

Figure 4:
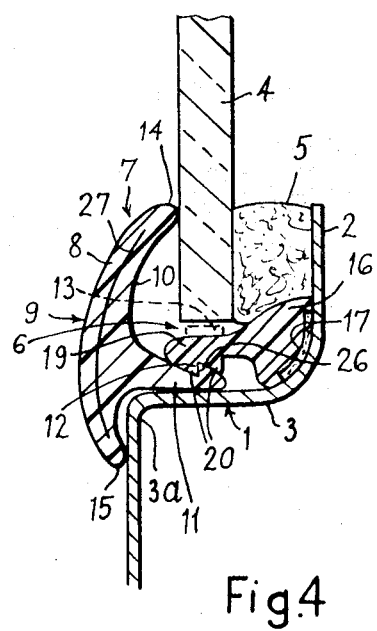

The retainer means may take other forms than that shown in FIGS. 1 to 3. For example, as shown in FIG. 4, it may comprise a strip 16 of flexible platics material, for example polyvinyl chloride, which is secured in the rebate, before the glass is inserted, by a layer of sealant provided in a channel 17 in the surface of the strip 16 which faces the back of the rebate. The shoulder 12 on the web 11 of the trim strip engages behind the shoulder formed by one of one or more saw-tooth projections 20 on a portion 19 of the retainer strip 16. The portion 19, together with the web 11, may act to support the lower edge of the glass panel to avoid the glass dropping due to any thermal softening of the adhesive 5, or a plurality of datum blocks, one of which is shown in dotted lines at 13, may be inserted at intervals between the lower edge of the glass and the opposing wall 3 of the rebate to maintain a spacing of, for example, approximatley 0.20 inch between the glass and the bottom of the rebate. The datum blocks may be separate members, parts of the web 11 being cut out where the blocks are located to allow the trim strip to be properly inserted in the gap.

Figure 6:
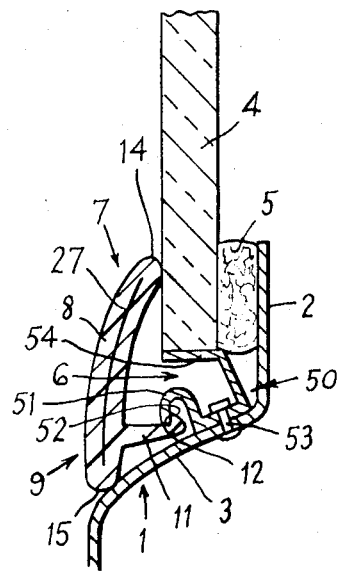
Figure 7:
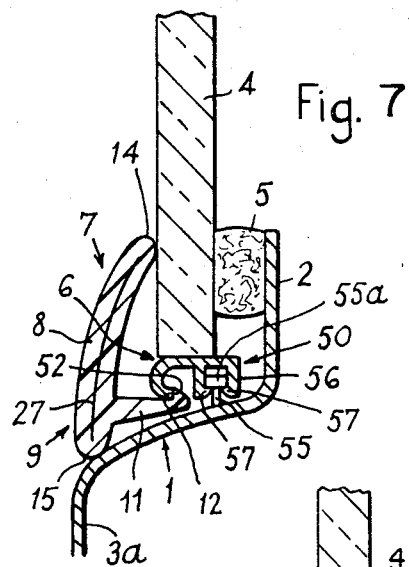
Figure 8:
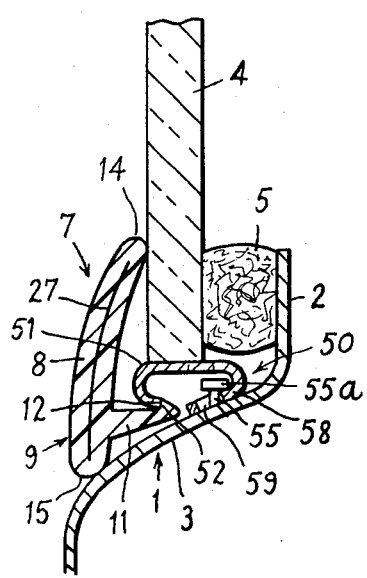

Three further forms of retainer means are shown in FIGS. 6 to 8 which take the form of retainer strips or clips secured to the peripheral wall 3 of the rebate. In each case the retainer strip, indicated at 50 is suitably made of metal or a hard plastics material, e.g. aerylonitrile butadiene styrene (ABS), and includes a continuous or interrupted hook portion 51 defining an outwardly directed, rearwardly facing shoulder 52 behind which the shoulder 12 on the web portion 11 of the trim strip latches.

In the embodiment shown in FIG. 6 the retainer strip 50 is secured to the rebate by rivets 53 inserted at spaced positions along the strip. It preferably includes a continuous or interrupted support portion 54 for supporting the lower edge of the glass.

In the embodiments shown in FIGS. 7 and 8, the retainer strips are secured to the rebate by means of inwardly projecting studs 55, having heads 55a provided on the peripheral wall 3 at spaced positions therealong. The strip shown in FIG. 7 includes an outwardly facing channel portion 56 having inturned lips 57 and is secured in position by snapping the channel portion over the heads of the studs. The strip of FIG. 8 includes a portion 58 provided with keyhole slots 59 at positions corresponding to the positions of the studs 55 and is secured in position by fitting the strip over the studs. In FIGS. 7 and 8 the retainer strips also serve to support the bottom edge of the glass.

In all the embodiments described above the web 11 is connected to the back of the front strip portion and the side edges of the front strip portion engage the rebate and the front of the glass respectively and by reason of the arcuate or bent form of the front strip portion, the strip can be bent around the normal radius at the corners of the windscreen without buckling of the inner edge of the front strip portion around such bends, the front strip portion being able to bend or bow so that the radius followed by the inner edge is increased at least partly to compensate for the compression of the plastics material along the inner edge.

Figure 5:
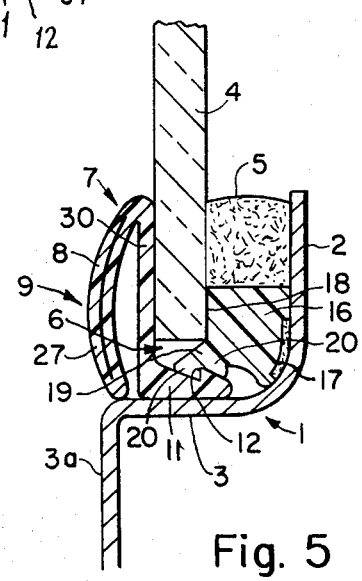

A further embodiment is shown in FIGS. 5 in which the trim strip 7, again conveniently extruded of polyvinyl chloride, comprises a front strip portion 8 connected to the web portion 11 by a connecting strip portion 30 which, when the trim strip is fitted around the edge of the glass, lies against the front of the glass, and the front strip portion 8 is flexibly joined along one edge only to one edge of the connecting strip portion 30 and overlies the connecting strip portion, being wider than the latter so that its free edge projects beyond the other edge of the connecting strip portion sufficiently to engage against the peripheral wall 3 of the rebate when the trim strip is positioned around the glass panel 4, as shown, the front strip portion 8 thereby enclosing the space between the edge of the glass and the rebate. The plastics material joining the front strip portion 8 and said edge of the connecting strip portion 30 forms a flexible hinge junction which, being the only connection between the portions 8 and 30 allows the front strip portion 8 to flex away from the connecting strip portion 30 when the trim strip is pressed into the rebate so that the free edge of the front strip portion can bear firmly against the peripheral wall of the rebate. The web portion 11 is joined to the connecting strip portion at its other edge.

The front strip portion 8 is wide enough to accommodate variations in the sizes of the glass panel 4 and the windscreen opening and such that it will hide the adhesive 5.

In the embodiment shown in FIG. 5, the web portion 11 is provided with an inwardly facing shoulder 12 along its free edge. The trim strip 7 is retained in position by a retainer strip 16 of flexible plastics material similar to that shown in FIG. 4, the shoulder 12 on the web 11 engaging behind the shoulder 20 on the retainer.

As shown in this Figure, the retainer 16 is provided with a shoulder 18 which serves to maintain a minimum spacing between the glass panel and the back wall of the rebate. The back of the glass may be spaced slightly from the shoulder 18 due to the resilience of the sealant 5.

In a modification (not illustrated) of the arrangement shown in FIG. 5, the front strip portion 8 is made wider than is shown so that its free edge projects beyond the connecting strip portion sufficiently to engage against the front 3a of the rebate when the trim strip is inserted into the rebate. The flexible hinge junction between the portions 8 and 30 allows the front strip portion 8 to flex away from the connecting strip portion 30 when the trim strip is pressed into position, with the free edge of the front strip portion bearing against the front 3a of the rebate. The flexing of the front strip portion 8 away from the connecting strip portion 30, when the trim strip is secured in position, has the effect of causing the inner and outer edges of the front strip portion to be pressed into firm contact with the glass 4 and front of the rebate respectively, even around the radius to which the strip is bent at the corners of the glass panel.

In these embodiments buckling of the inner edge of the front strip portion around the normal radius at the corners of the windscreen is avoided by reason of the free outer edge of the front strip portion 8 being free of any reinforcing flange or enlargement such as is provided by the hinge junction with the connecting strip portion 30 at the inner edge of the front strip portion, and that only said inner edge is so reinforced, the free outer edge, and zones of the front strip portion across its width between its free outer edge and the hinge junction at its inner edge, being free to stretch sufficiently when the trim strip is bent around such bends.

The front strip portion of the trim strip 7 is preferably constructed to provide a decorative metallic appearance to which end, in the embodiments shown in FIGS. 1, 4 and 5, the extrusion is made of a transparent material such as crystal clear polyvinyl chloride, with a strip of aluminium foil 27 embedded or encapsulated in said front strip portion so that its bright surface is visible through the front 9 thereof. The foil strip may be curved in cross-section to follow the curvature of the front strip portion as shown in FIGS. 4 and 5. Or it may be bent so as to have a shallow V-shaped cross-section as shown in FIG. 1.

In the embodiment shown in FIG. 3, the decorative metallic appearance is provided by bonding a decorative layer 28, e.g. a strip of metal foil covered with a transparent protective layer, to the front surface of the front strip portion 8. The decorative layer 28 may consist of a metal-plastics foil laminate comprising a strip of metal foil, e.g. aluminium foil, laminated between two layers of plastics foil of which at least one is transparent, e.g. transparent P.V.C., or MYLAR (Trade Mark), and forms the front surface when the laminate is bonded to the front strip portion 8, and of which the other is capable of being bonded by adhesive and/or heat to the front surface 9 of the front strip portion 8. The laminate may also be constructed as described in the specification of my co-pending application U.S. Pat. No. 845,155 filed July 28, 1969 now U.S. Pat. No. 3,681,180. When the decoration is provided by bonding a decorative layer to the front of the front strip portion 8, as shown in FIG. 3 it is not necessary for the trim strip 8 to be extruded from transparent plastics material.

In the embodiments of FIGS. 1 to 4 and 6 to 8, by reason of the bent or arcuate cross-section of the decorative metal foil, crinkling of the foil around bends of normal radius is avoided or alleviated, particularly if the metal foil is originally bent or curved in cross-section to a greater degree than the front strip portion.

Crinkling of the decorative metal foil in the embodiment of FIG. 5 is avoided by the foil stretching across its width, to increasing degrees towards said free outer edge of the front strip portion, without any noticeable compression of the foil adjacent the inner edge of the front strip portion.

In all embodiments, instead of applying the adhesive to the back wall of the rebate it may be applied to the glass, before the latter is inserted in the rebate.

If desirable for the adhesive used, a coating of a primer may be applied to the zones of the back of the glass and the back of the rebate where the adhesive is to be adhered. Also, depending on the adhesive used, a curing or other setting operation may be required firmly to stick the glass in the rebate. The adhesive is conveniently applied in the form of a ribbon and preferably has a cross-section which is tubular or waisted or has a groove, such as a V-groove, in order to improve its compressibility and to avoid the adheisve spewing out too much or over the rebate when the adhesive is compressed between the glass and the back of the rebate.

One adhesive which we have found to be satisfactory is the butyl rubber adhesive sealant known as "PTI Auto Glass Tape" made by Protective Treatments Inc. of Dellrose Avenue, Dayton, Ohio, U.S.A.

If it be desired to cover the mass of adhesive 5 where it is exposed between the back of the glass and the edge of the back wall 2 of the rebate, this may be effected by applying a further interior trim strip thereover. Various suitable interior trim strips are described in the specification of my copending application U.S. Pat. No. 865428 aforesaid.

While particular embodiments have been described, it will be understood that various modifications may be made without departing from the scope of the invention. For example, the trim strip could be made of two or more extruded sections, of the same or different materials, which could be bonded together during extrusion or subsequently to form the complete unitary trim strip.

Further, the front of the trim strip may have a facing of metal, e.g. stainless steel, or other suitable material secured thereto, for example by an interengaging or clip connection or by adhesive. Or the front strip portion may be of opaque material of a colour suitable for the vehicle body styling.

In the embodiment shown in FIG. 1, the peripheral wall of the rebate is perpendicular to the back wall thereof. The peripheral wall of the rebate may, however, slope away at an obtuse angle from the back wall in the forward direction, in which case the outer part of the front strip portion may be wider than shown depending on the slope of the peripheral wall. For example, the trim strip could have the configuration shown in FIG. 3.

Where the outer edge of the front strip portion engages the side of the rebate, it may be formed by a more flexible marginal zone constituting a flexible lip which is adapted to flexibly engage the peripheral wall of the rebate and acts as a gasket sealing against the peripheral wall. The lip may be constructed to assume a V-shaped or U-shaped configuration when the trim strip is inserted in the rebate. The lip may be made of the same plastics material as the front strip portion and extruded integrally therewith. In another form, the lip is made of a material which is softer and of a more flexible nature than the front strip portion, in which case it may, if the materials of the lip and the main part of the front strip portion are compatible, be fused to the main part of the front strip portion, for example by simultaneously extruding both materials and bonding them together by pressure in a common die or by bringing them together, preferably under pressure, as they are being extruded through separate dies. Such modified constructions of the front strip portion are described in the specification of my copending application U.S. Pat. No. 135,574 filed Apr. 20, 1971 for Improvements in glazing window or windscreen openings, particularly in vehicle bodies.

I claim:

1. A window assembly comprising:
   a. a rebate defining an opening in a body in which a glass panel is fitted, said rebate having a back wall and a peripheral wall,
   b. a layer of adhesive between a peripheral zone of the rear surface of the glass panel and said back wall of the rebate and adhesively securing said glass panel to said back wall with the edge of the glass panel spaced from said peripheral wall of the rebate,
   c. retainer means disposed in the rebate at the top, bottom and sides of said opening, said retainer means comprising rigid shoulder-like retention means having a shoulder extending substantially continuously around the glass panel and facing outwardly of the edge of the glass panel and towards the back wall of the rebate, said retainer means being secured to said rebate by securing means separate from said adhesive utilized to secure said glass panel to the back wall of the rebate, said shoulder being spaced substantially equally from those portions of said peripheral wall which are opposite said shoulder, the retainer means in the bottom part of the rebate comprising at least one portion on which the lower edge of the glass panel is supported,
   d. at least one length of a decorative trim strip of flexible plastics material comprising a front strip portion having inner and outer edges respectively engaging the front surface of the glass panel and the body adjacent the front of said peripheral wall and thereby covering said space between the glass panel and said peripheral wall and also the peripheral zone of the front of the glass panel, and a web portion extending rearwardly of said front strip portion and having shoulder-like retention means adjacent its free edge in engagement with the shoulder-like retention means of said retainer means, the arrangement being such taht the inner edge of the front strip portion is pressed against the glass panel and the reaction urges the trim strip to fulcrum about the outer edge of the front strip portion in a direction to maintain the shoulder-like retention means of the web in engagement with the shoulder-like retention means of said retainer means, and being such that a force tending to move the glass panel out of the rebate is resisted separately by said adhesive and by said retainer means.

2. An assembly according to claim 1, wherein said retainer means comprises a metal strip having closely spaced hook-shaped elements projecting from one edge and spaced feet projecting from the other edge, the feet being secured to the rebate and the free ends of the hooks forming said substantially continuous shoulder-like retention means.

3. An assembly according to claim 1, wherein said web portion of the trim strip is joined to the back of the front strip portion nearer to the outer edge than the inner edge, thereof.

4. An assembly as claimed in claim 3, wherein at least the front strip portion of the trim strip is made of transparent material and has a layer of metal imbedded therein which is visible through the front surface of said front strip portion, said front strip portion and the metal layer being bent rearwardly along a line between the inner edge of the front strip portion and its junction with the web portion.

5. A window assembly according to claim 1, wherein the trim strip comprises a web portion connected to the front strip portion thereof by a connecting strip portion which lies against the front of the glass, said front strip portion being flexibly joined along its inner edge only to the inner edge of the connecting strip portion, the front strip portion overlying said connecting strip portion and projecting therebeyond to engage the body adjacent the front of the peripheral wall of the rebate, and the web portion being joined to the connecting strip portion at or adjacent its other edge.

* * * * *